United States Patent [19]

Weiergräber

[11] Patent Number: 5,102,538
[45] Date of Patent: Apr. 7, 1992

[54] APPARATUS FOR THE TREATMENT OF FILTER SLUDGE CONSISTING PREDOMINANTLY OF DIATOMITE AND METHOD OF OPERATING SAME

[75] Inventor: Peter Weiergräber, Erkrath, Fed. Rep. of Germany

[73] Assignee: Tremonis Gesellschaft Mit Beschrankter Haftung Brauerei-Nebenerzeugnisse, Dortmund, Fed. Rep. of Germany

[21] Appl. No.: 585,317

[22] Filed: Sep. 19, 1990

[30] Foreign Application Priority Data

Sep. 20, 1989 [DE] Fed. Rep. of Germany ....... 3931352
Oct. 27, 1989 [DE] Fed. Rep. of Germany ....... 3935952
Oct. 27, 1989 [DE] Fed. Rep. of Germany ....... 3935953

[51] Int. Cl.$^5$ .................................... B01D 17/038
[52] U.S. Cl. .................................... 210/180; 210/181; 210/182; 210/188; 210/194; 210/512.2
[58] Field of Search ............... 210/767, 774, 787, 788, 210/175, 179, 180, 181, 182, 187, 194, 195.1, 195.3, 512.1, 512.2, 188

[56] References Cited

U.S. PATENT DOCUMENTS

4,315,824  2/1982  Karolkiewicz .................. 210/779

Primary Examiner—Frank Sever
Attorney, Agent, or Firm—Herbert Dubno

[57] ABSTRACT

An apparatus for the treatment of diatomite, especially in a filtration sludge for disposal in a landfill or reuse as a filtration aid, having a flow dryer followed by a cyclone and filter separator. The dry product is then subjected to treatment in a high-temperature treatment chamber and a cyclonic separator separates 80% of the solids from the gas. These solids are quenched and then cooled. The balance of the solids in the gas stream are fed as the drying gas to the flow through dryer after water injection cooling to reduce the temperature of the hot gas to a temperature at below that which organics are volatilized in the dryer.

8 Claims, 2 Drawing Sheets

APPARATUS FOR THE TREATMENT OF FILTER SLUDGE CONSISTING PREDOMINANTLY OF DIATOMITE AND METHOD OF OPERATING SAME

FIELD OF THE INVENTION

My present invention relates to an apparatus for the treatment of a filter sludge consisting predominantly of diatomite which can have a predetermined particle size distribution, can contain organic components and can include expanded perlite or vermiculite.

The invention relates more generally to the treatment of diatomite which can, in the case of diatomite used as a filtration aid, so treat the diatomite that it can be disposed of in a landfill without an environmental hazard or, in the case of either new diatomite or diatomite which has been used in filtration, can produce a product capable of being used as a filtration aid. The invention also relates to a method of treating diatomite or filtration sludges in which the principal solid component is diatomite or to a method of operating the improved apparatus of the invention. In the present description, the term "diatomite" is used interchangeably with the terms kieselgur and kieselguhr and diatomaceous earth.

BACKGROUND OF THE INVENTION

An apparatus for the treatment of filtration sludges in which kieselgur or diatomaceous earth constitutes the major solid component as a result of the use of the diatomite in the filtration process as a filtration aid, generally comprises a feed device for finely distributing the filtration sludge into a flow-drying unit for the drying and dispersing thereof into a flow of gas. The resulting granular product is separated from the drying flow in a cyclone and filter unit and is subjected to treatment in a high-temperature treatment chamber with a treatment gas stream, the treatment gas stream being separated from the treated product which can then be cooled.

The term "treatment" is used herein to refer to a treatment of the diatomite which will allow a problem-free disposal of the solid residues in a landfill, i.e. landfill disposal without subsequent environmental problems. It also refers to a regeneration which allows the treated product to be used as a filter aid.

Kieselgur or diatomite is a mineral product (see Römpps Chemie-Lexikon, 1973, 1770) which is used as a filter aid in various industries. For example, it may be used in the sugar industry, in the brewery field and in the chemical and pharmaceutical industries to provide a filter mass and to serve as an adsorbent for various organic contaminants.

Apart from the various kieselgurs or diatomites which are employed for this purpose, the filter aid can include other filtration auxiliaries in the inert dry mass. These can include expanded or blown perlite or expanded or blown vermiculite.

The filtration sludge can contain, apart from these filtration aids, various substances deposited on the solid particles. These substances are predominantly of an organic nature and make the treatment necessary.

The quantities of perlite and vermiculite generally are present in only several percent by weight. They serve to provide greater stability of the fine particulate mass against mechanical stresses.

The filtration sludge can also include silica gel which is frequently used in contact processes together with kieselgur.

Of course, the precise compositions of filter sludges will depend on how they were produced.

When reference is made herein to dispersing of the filtration sludge, I mean to describe a breakup of the dispersion solution to primary particles or granules. When filtration sludges which derive from brewery processes are employed, the process should be able to produce a treated product which can be reused as a brewery filter aid. In that sense the invention should be considered to be capable of providing a closed circulation for the kieselgur and diatomite.

In the processes which have been used heretofore, the treatments did not always give rise to satisfactory reusable products or products which could be subjected to safe prolonged landfill disposal. In earlier systems a transformation of noncrystalline silicic acid contained in the kieselgur to crystalline silicic acid has been observed. This has been found to be detrimental to the reuse of the treated product as a filtration aid.

Furthermore, the conventional apparatus as described has been found to require improvement since problems have been observed therein as a result of agglomeration and detrimental deposit formation, especially in the filter unit through which the drying gas must pass. These problems are of greater significance when filter sludges of different origins are treated. Furthermore, the conventional apparatus has been found to have an inordinately high energy demand, to require extensive gas cleaning, and to create problems with respect to release of the gas into the environment.

OBJECTS OF THE INVENTION

It is the principal object of the present invention to provide an apparatus for the purposes described which is free from the drawbacks of earlier apparatus.

Another object of this invention is to provide an improved apparatus for the treatment of a filter sludge for reuse (regeneration) of the diatomite filter aid or which will facilitate disposal thereof in an environmentally sound manner.

It is also an object of this invention to provide an apparatus for the treatment of filtration sludges or diatomite in general so that the latter can be used as a filter aid with a minimum of alteration in the composition of the diatomite or its particle size distribution.

Still another object of my invention is to provide an improved apparatus which can effect the treatment of a filtration sludge in which the solids predominantly are constituted by diatomite, whereby the energy consumption is reduced.

SUMMARY OF THE INVENTION

These objects and others which will become apparent hereinafter are attained, in accordance with the invention in an apparatus for treating diatomite which comprises:

a high-temperature treatment chamber having a vertical axis and a circular cross section and formed as a fluidized flow reactor;

vortex-generating means at a base of the chamber and coaxial therewith for imparting to a treating gas stream introduced into the chamber, an ascending vortex flow about a vertical axis of the chamber;

a feed lance extending axially downwardly into the chamber from above and coaxial with the chamber and the vortex-generating means for introducing diatomite into the chamber for treatment with the gas stream;

a treating-gas generator connected to the vortex-generating means for producing the treating gas and feeding the treating gas to the vortex-generating means, the treating-gas generator comprising:
a combustion chamber,
means for feeding a flowable fuel into the combustion chamber for combustion therein,
means for feeding compressed air into the combustion chamber, and
means for supplying fresh air to the combustion chamber whereby the treating gas stream is generated with sufficient energy and oxygen content to burn off organic contaminants of the diatomite in the high-temperature treatment chamber;

means forming a lateral outlet from the high-temperature treatment chamber through which treated diatomite is carried continuously out of the high-temperature treatment chamber in a hot gas;

a hot-gas cyclone unit, comprising:
a cyclone lined with a refractory ceramic and receiving the hot gas having treated diatomite entrained therein for separating the hot gas from the treated diatomite, whereby about 80% of solids entrained in the hot gas are recovered therefrom in the cyclone,
a quencher connected to a bottom of the cyclone for rapidly quenching the treated diatomite recovered from the hot gas in the cyclone, and
cooling means connected to the quencher for further cooling the treated diatomite recovered from the hot gas in the cyclone; and
means for conducting the hot gas with about 20% of the solids entrained therein from the cyclone for recycling of the latter solids When the diatomite introduced into the high temperature reaction chamber is present in a mechanically dewatered filtration sludge containing the diatomite with a predetermined particle size distribution, organic contaminants on the diatomite and, optionally, expanded perlite or vermiculate, the apparatus can further comprise:
feeder means for supplying the filtration sludge in finely divided form;
a flow-drying unit connected to the feeder means for receiving the filtration sludge in finely divided form and drying the filtration sludge by entrainment thereof in a drying gas stream;
a cyclone-and-filter unit comprising:
a low-temperature cyclone connected to the flow-drying unit for partially separating dried solids in granular form from the drying gas stream,
a filter connected to the low-temperature cyclone for additionally separating dried solids in granular form from the drying gas stream, and
means for feeding dried solids separated in granular form from the drying-gas stream to the lance for introduction thereby into the high-temperature treatment chamber, the means for conducting feeding the hot gas with solids entrained therein to the flow-drying unit as the drying gas stream; and
a water-spray cooler forming part of a process control unit for injecting cooling water into the drying gas stream to maintain a temperature of the drying gas stream low enough to prevent volatilization of the organic contaminants from the diatomite in the flow-drying unit.

The invention is based upon the discovery that the prior art apparatus for the treatment of a filtration sludge or for the recovery of a filter aid constituted of kieselgur or diatomite can be improved so that organic components are practically eliminated in the high-temperature treatment chamber and are as completely as possible combusted therein.

Furthermore, in the flow-drying apparatus an evaporation of the organic components is prevented from arising so that deposits do not tend to form in the solids filter of the cyclone-filter unit and hence expensive additional cleaning of the discharged gases can be avoided.

In spite of the fact that the filtration sludge may have different contents of organic components and thus may require different high temperatures in the high-temperature treatment chamber wherein a combustion gas is used to treat the solids, the treatment can be carried out in an energy-saving way since the hot gases recovered from the hot gas cyclone can be introduced into the flow-drying unit without the danger of evaporation of the organic components because of the use of the spray water cooling to control the temperature of the drying gas flow in an extremely short period of time Surprisingly, the solids which are carried by the drying gas are not caused to agglomerate and indeed agglomerates appear to be broken down at least to the extent that agglomeration may be detrimental The mean residence time of the dry product in the high-temperature treatment is short. It can be so selected that a transformation of the noncrystalline silicic acid into crystalline silicic acid is not to be feared.

The quench cooling of the treated product leaving the hot gas cyclone also serves to prevent a detrimental transformation of the noncrystalline silicic acid into crystalline silicic acid.

While it is true that the dry product from the treatment in high-temperature treatment chamber can develop larva-like flow characteristics, the quenching directly following the passage of the solids out of the hot gas cyclone, allows the solid product to be readily conveyed and handled.

In general, therefore, the invention provides a simple treatment of filter sludge for disposal purposes or for regeneration of the kieselgur as a filter aid from mechanically dewatered filtration sludge in a reliable manner and without detrimental change in composition of the kieselgur or its particle size distribution. The apparatus also operates at very low energy cost According to another feature of the invention, to ensure that the combustion of the organic components is as complete as possible, the high-temperature treatment chamber has a pear-shaped reaction chamber as well as a device for imparting a vortex pattern of movement to the rising gases therein at its base. At the gas outlet this chamber has a reduced cross section The high-temperature treatment chamber can be operated with a treatment gas which is above the ignition temperature of the organic contaminants and can be admitted to the high-temperature treatment chamber at a temperature of 600° C. or more.

The quenching unit directly connected to the hot gas cyclone can be constituted as a water cooled chute or helix. It is important that the treated solids, upon leaving the hot gas cyclone, be cooled extremely rapidly from their outlet temperature of about 800° C. to a temperature of 550° C. or lower.

The injection water cooling which forms part of the control circuit for the temperature of the drying gas stream is of high sensitivity and hence reacts rapidly to prevent rises in the drying temperature from causing evaporation of the organic components or drops in the drying temperature to limit drying efficiency.

According to a further feature of the invention, downstream of the drying unit, the solids entrained in the drying stream can be subjected to impingement baffling so that any agglomerates are comminuted by the impingement action.

The apparatus of the invention can be controlled and regulated over a wide range so that simple and reliable treatment of the filtration sludge and the recovery of a filter aid, can be ensured, even in the case of filter sludges of different origins and hence compositions are used as starting materials.

In a preferred embodiment of the invention, where filter sludges of different compositions or origins are used, they may be mixed with other filter sludges to provide a composition which can be considered a apparatus-typical composition, i.e. a composition which is comparatively standard for feeding to the drying unit.

BRIEF DESCRIPTION OF THE DRAWING

The above and other objects, features and advantages of my invention will become more readily apparent from the following description, reference being made to the accompanying highly diagrammatic drawing in which.

SPECIFIC DESCRIPTION

Figure 1:
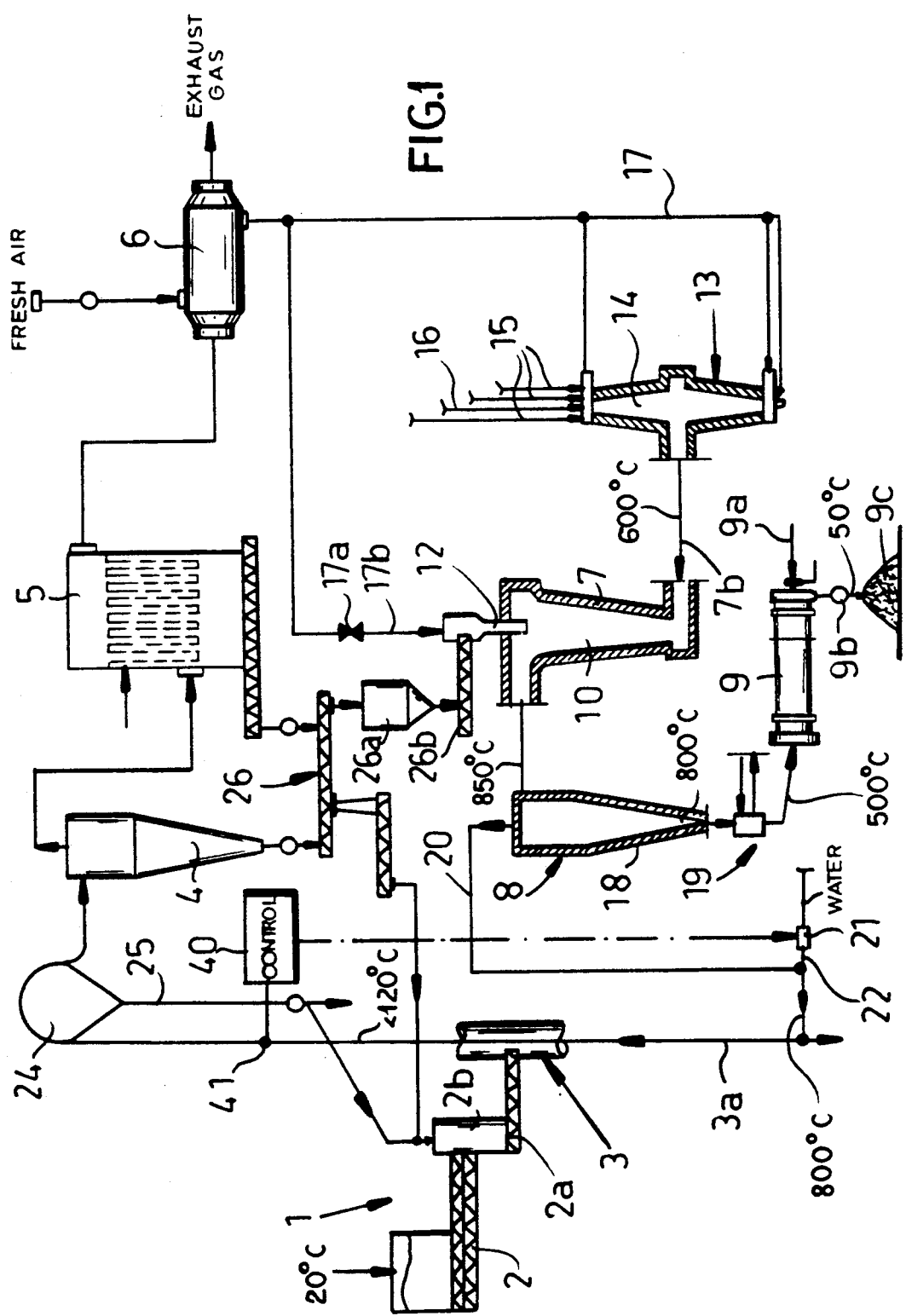
FIG. 1 is a flow diagram illustrating the apparatus of the invention.

The apparatus illustrated in FIG. 1 is used for the treatment of a mechanically dewatered filtration sludge in which the solids consist predominantly of kieselgur or diatomite. The treatment can represent a complete regeneration of the diatomite to allow it to be used again as a filter aid.

The filter sludge comprises kieselguhr of a predetermined particle size distribution, organic contaminants which have deposited upon the diatomite and, frequently, expanded perlite, expanded vermiculite or silica gel.

The apparatus comprises a feed unit 1 for distributing in finely divided form the filter sludge into a flow-drying apparatus 3. The means used for the purpose can be screw conveyors or the like and such screw conveyors have been represented at 2 and 2a. A chamber 2b feeding the screw conveyor 2a can receive feedback solids from other stages in the process as will be described. The flow-drying unit 3 operates with an upwardly flowing drying gas stream whose flow velocity is sufficient to entrain the finely divided filtration sludge.

The drying gas stream and the dried granules or particles are passed into a cyclone and filter unit 4, 5 for separating the solids from the gas. This unit can comprise a cyclone 4 effecting a coarse separation and a filter 5 effecting a fine separation. The drying gas, as exhaust gas, is passed through a heat exchanger which heats fresh air drawn from the ambient. This fresh air can serve as an entraining air or combustion air as will be described. Following the heat exchanger 6, the exhaust gas can be subjected to additional cleaning, if necessary, and is then released into the atmosphere.

Of special significance to the apparatus of the invention is the high treatment chamber 7 for the treatment of the dry solids with the treating gas stream.

Downstream of this chamber, I provide a hot gas cyclone unit 8 for the separation of the treated product from the treating gas stream. A cooling unit 9 for cooling the treated product can be provided in the form of a rotary tube treatment apparatus supplied with cooling air at 9a. At a discharge gate 9b, the cooled granular product 9c is recovered which can be used again as a filter aid.

The arrows in the drawing showing the flow paths for the various solids and gases The drawing also indicates at various points the temperatures which prevail at those locations in the system. To the extent illustrated, therefore the flow patterns need not be more specifically described in the present text.

Figure 2:
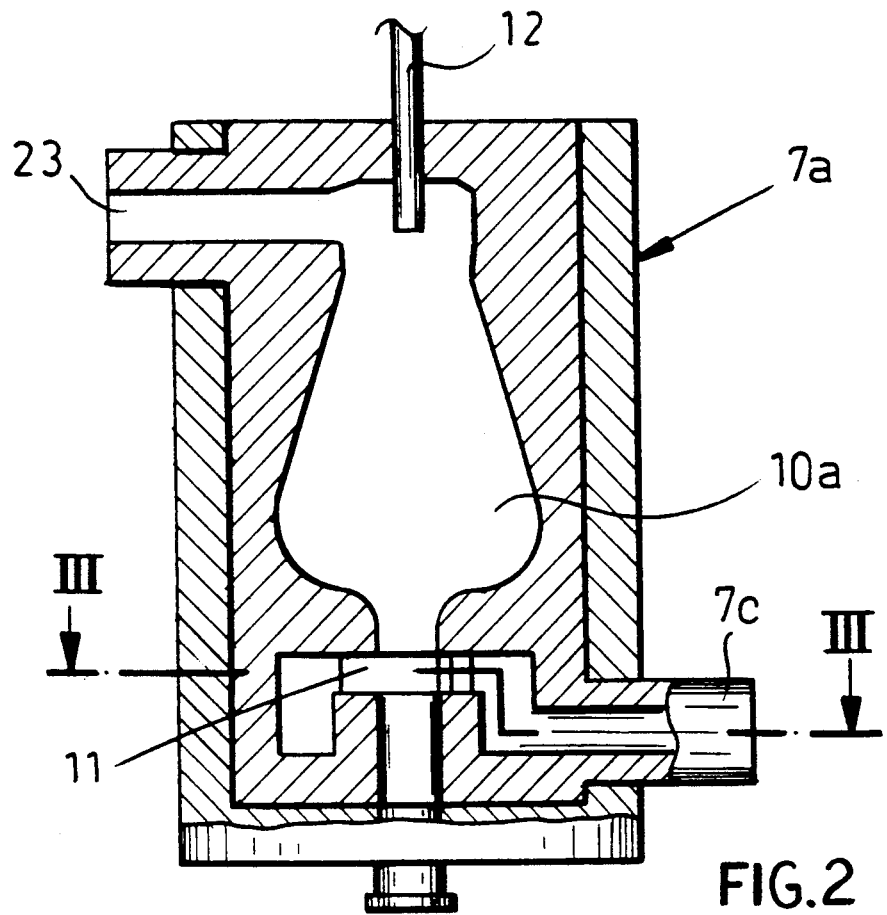
FIG. 2 is an axial section through a high-temperature treatment chamber according to the invention.
Figure 3:
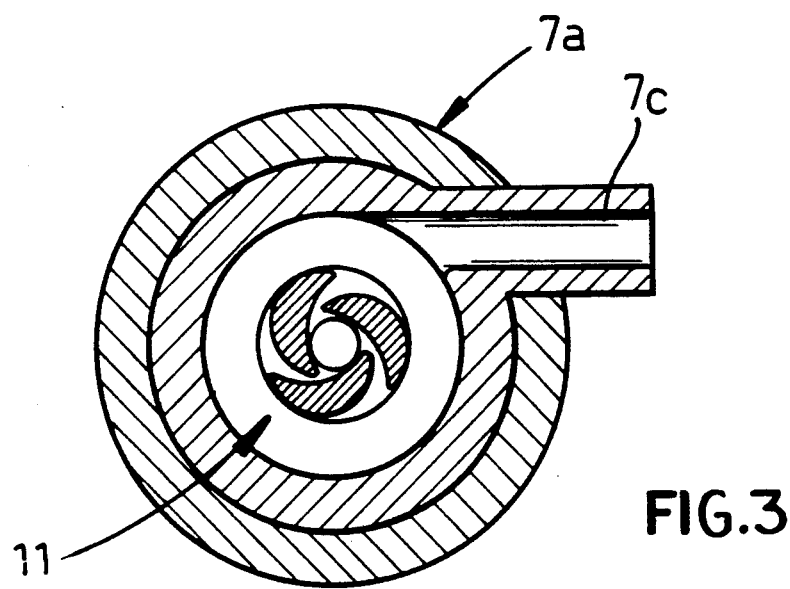
FIG. 3 is a section taken along the line III—III of FIG. 2.

As will be apparent from FIGS. 1-3, the high-temperature treatment chamber 7 or 7a can be formed as a fluidizing vortex-flow reactor having a vertically extending reaction space 10 or 10a provided at its base with a vortex generating device 11 producing an upwardly extending vortex which is coaxial with the reaction chamber 10 or 10a.

Into the reaction chamber from above extends a feed lance 12 coaxial with the vortex generator and the chamber and feeding the dry product into the treatment chamber.

As can be seen from FIG. 1, the lance 12 may receive an air input via a valve 17a and a line 17b from the heat exchanger 6 so that the solids are blown by heated air into the chamber 7. The solids are delivered into the injector or lance 12 by a hopper 26a and a screw feeder 26b.

The high-temperature treatment chamber 7 is supplied with treating gas via the line 7b or 7c so that this gas is converted into a rising vortex. In the embodiment of FIGS. 2 and 3 the treating gas inlet opens tangentially into the vortex generator 11.

The treatment gas delivered at 7b or 7c to the treatment chamber derives from a gas generator 13.

The treatment gas generator 13 comprises a combustion chamber 14, a device for feeding liquid and/or gaseous fuel to the combustion chamber, a device such as a compressor (not shown) and an inlet pipe 16 for supplying compressed air to the chamber and a device 17 for fresh air supply.

The treatment gas generator 13 is so configured and supplied with fuel and air that combustion is sustained therein and the treatment gas flow has sufficient flow energy at a sufficient temperature and residual oxygen content to enable, in combination with the air supplied by the injector 12, to fully burn off the organic components in the treatment chamber 7.

The hot gas cyclone 8 is lined with a refractory lining 18 of ceramic. It is dimensioned to effect a solid separation from the gas of 80% of the entrained solids.

Downstream of the hot gas cyclone 8, a quenching unit 19 is provided and the solids passing therethrough are quenched before being admitted to the cooler 9.

The hot gas outlet 20 from the cyclone 8 is connected to the flow drying unit 3.

The hot treating gases, entraining about 20% of the original solids content of the gases entering the cyclone, is fed into the flow drying unit 3.

A process control system is provided for this purpose. At 21, for example, I show a valve controlling water injection at 2 into the line 20 connecting the hot gas cyclone with the line 3a of the flow drying unit 3 The valve 21 is controlled, in turn by a control circuit 40 having a sensor 41 detecting the temperature of the gases in the flow drying unit.

Using the feedback control system 40, 41, the valve 21 controls the water injection to provide a temperature of the drying gas stream which is low enough to prevent evaporation of the organic contaminants in the flow drying unit but nevertheless high enough to ensure that the drying will occur.

From FIGS. 2 and 3 it will be apparent that the high temperature treatment 7a can have, in vertical section, a pear-shaped reaction space 10a as well as a vortex generator 11.

The flow cross section of the chamber 10a converges toward a gas outlet of reduced cross section. The high-temperature treatment chamber 7 is provided of a material capable of withstanding the treatment chamber.

The treatment gas stream enters at a temperature of about 600° C. but in any event at a temperature above the ignition temperature of the organic components which are burned therein.

According to a feature of the invention, the high temperature chamber 7a is operated at a subatmospheric temperature. It can also be a conical chamber as shown in FIG. 1 for the chamber 7.

The quenching unit 19 is formed with a water cooled chute or helix.

Upstream of the cyclone unit 4, an impingement baffle device 24 is provided in which the high velocity gas stream entraining the dry granules from the flow through dryer is subjected to impingement against a surface and deflection therealong to breakup any agglomerates The dry solids which settle from the gas stream are recycled by line 25 to the chamber 2b. The dry products obtained in the cyclone 4 and the dry products obtained from the filter 5 are fed via the feed unit 26 to the high-temperature treatment chamber 7 in the manner described A portion of these solids are fed back to the chamber 2b for recycling into the flow though dryer 3.

The high-temperature treatment chamber 7 or 7a, also referred to as a vortex flow reactor can be provided at its upper part (in a manner now shown) in a device which allows gas flow impulses in a more or less tangential direction in the region or the wall into this chamber These shots of gas can serve to maintain the inner walls of a high-temperature treatment chamber clean and improve the reliability of the apparatus. In the wall of the hot gas cyclone 8, baffles or flow interfering elements can be provided and such elements likewise can be provided along the axis of the hot gas cyclone to impart oscillating movements or interfere with the cyclonic flow therein so that sufficient solids will remain in the dry gas stream fed to the flow-drying unit 3.

The solids discharged from the cooling device 9 can be disposed of in a landfill or reused as a filter aid, especially for brewery filtration The apparatus of the invention can also be used for the treatment of raw diatomite and, in place of a filtration sludge, the raw diatomite in granular and especially fine grain form is employed, the treated product being used as a filter aid.

I claim:

1. An apparatus for treating diatomite, comprising:

a high-temperature treatment chamber having a vertical axis and a circular cross section and formed as a fluidized flow reactor;

vortex-generating means at a base of said chamber and coaxial therewith for imparting to a treating gas stream introduced into said chamber, an ascending vortex flow about a vertical axis of said chamber;

a feed lance extending axially downwardly into said chamber from above and coaxial with said chamber and said vortex-generating means for introducing diatomite into said chamber for treatment with said gas stream;

a treating-gas generator connected to said vortex-generating means for producing said treating gas and feeding said treating gas to said vortex-generating means, said treating-gas generator comprising:

a combustion chamber, means for feeding a flowable fuel into said combustion chamber for combustion therein, means for feeding compressed air into said combustion chamber, and means for supplying fresh air to said combustion chamber whereby said treating gas stream is generated with sufficient energy and oxygen content to burn off organic contaminants of said diatomite in said high-temperature treatment chamber;

means forming a lateral outlet from said high-temperature treatment chamber through which treated diatomite is carried continuously out of said high-temperature treatment chamber in a hot gas;

a hot-gas cyclone unit, comprising:

a cyclone lined with a refractory ceramic and receiving said hot gas having treated diatomite entrained therein for separating said hot gas from the treated diatomite, whereby about 80% of solids entrained in said hot gas are recovered therefrom in said cyclone, a quencher connected to a bottom of said cyclone for rapidly quenching the treated diatomite recovered from said hot gas in said cyclone, and cooling means connected to said quencher for further cooling said treated diatomite recovered from said hot gas in said cyclone; and means for conducting said hot gas with about 20% of said solids entrained therein from said cyclone for recycling of the latter solids 2. The apparatus defined in claim 1 wherein the diatomite introduced into said high-temperature treatment chamber is present in a mechanically dewatered filtration sludge containing the diatomite with a predetermined particle-size distribution, organic contaminants on the diatomite and optionally expanded perlite or vermiculite, said apparatus further comprising:

feeder means for supplying said filtration sludge in finely divided form;

a flow-drying unit connected to said feeder means for receiving said filtration sludge in finely divided form and drying said filtration sludge by entrainment thereof in a drying gas stream;

a cyclone-and-filter unit comprising:

a low-temperature cyclone connected to said flow-drying unit for partially separating dried solids in granular form from said drying gas stream, a filter connected to said low-temperature cyclone for additionally separating dried solids in granular form from said drying gas stream, and means for feeding dried solids separated in granular form from said drying-gas stream to said lance for introduction thereby into said high-temperature treatment chamber, said means for conducting feeding said hot gas with solids entrained therein to said flow-drying unit as said drying gas stream; and a water-spray cooler forming part of a process control unit for injecting cooling water into said drying gas stream to maintain a temperature of said drying gas stream low enough to prevent volatilization of said organic contaminants from said diatomite in said flow-drying unit.

3. The apparatus defined in claim 2 wherein said high-temperature treatment chamber has a pear-shaped configuration reaction space provided with said vortex generating means at a base thereof and a gas outlet of reduced cross section at an upper end thereof.

4. The apparatus defined in claim 2 wherein said treating gas generator is constructed and arranged to generate a treating gas of a temperature of about 600° C.

5. The apparatus defined in claim 2 wherein said quencher includes a water cooled chute or helix.

6. The apparatus defined in claim 2 wherein said process control unit is responsive to a temperature of said flow-drying unit.

7. The apparatus defined in claim 2 further comprising an impingement unit between said flow-drying unit and said cyclone and filter unit for breaking up agglomerates of solids from said flow-drying unit.

8. The apparatus defined in claim 1 Wherein raw diatomite is introduced into said high-temperature treatment chamber.

* * * * *